United States Patent [19]
Chibata et al.

[11] 3,791,926
[45] Feb. 12, 1974

[54] PROCESS FOR THE PRODUCTION OF L-ASPARTIC ACID

[75] Inventors: Ichiro Chibata, Osaka; Tetsuya Tosa, Kyoto; Tadashi Sato, Osaka, all of Japan

[73] Assignee: Tanabe Seiyaku Co., Ltd., Osaka, Japan

[22] Filed: Oct. 18, 1972

[21] Appl. No.: 298,529

[30] Foreign Application Priority Data
Oct. 28, 1971  Japan................................ 46-85778

[52] U.S. Cl................ 195/30, 195/DIG. 11, 195/59
[51] Int. Cl................................................. C12d 1/02
[58] Field of Search........................ 195/30, DIG. 11

[56] References Cited
UNITED STATES PATENTS
3,198,712   8/1965   Takahashi et al..................... 195/30

Primary Examiner—Alvin E. Tanenholtz
Attorney, Agent, or Firm—Bierman & Bierman

[57] ABSTRACT

At least one monomer selected from the group consisting of acrylamide, N,N'-lower alkylene-bis(acrylamide) and bis (acrylamidomethyl)ether is polymerized in an aqueous suspension containing an aspartase-producing microorganism. The resultant immobilized aspartase-producing microorganism is subjected to enzymatic reaction with ammonium fumarate or a mixture of fumaric acid or its salt and an inorganic ammonium salt. Divalent metal ion is preferably added to the anzymatic reaction solution. L-aspartic acid is produced.

33 Claims, No Drawings

PROCESS FOR THE PRODUCTION OF L-ASPARTIC ACID

This invention relates to a novel process for preparing L-aspartic acid. More particularly, it relates to the production of L-aspartic acid by enzymatic reaction of an immobilized aspartase-producing microorganism with ammonium fumarate.

It is well known in the art that aspartase has the ability to convert ammonium fumarate into L-aspartic acid. Various methods for producing L-aspartic acid by the enzymatic reaction of aspartase with ammonium fumarate are known. For example, L-aspartic acid can be prepared by cultivating an aspartase-producing microorganism in a nutrient medium containing fumaric acid and ammonia. Alternatively, it can be prepared by extracting aspartase from a microorganism, and reacting the enzyme with ammonium fumarate. However, these methods are disadvantageous in the commercial production of L-aspartic acid. L-aspartic acid produced according to these methods is contaminated with the enzyme, mycrobial cells, nutrient sources of the medium and/or protein. Accordingly, in order to recover L-aspartic acid having high purity additional steps for removing the enzyme and other contaminants from the product are required. Furthermore, when the enzymatic reaction is completed, the reaction solution is boiled and/or acidified to produce the enzyme or an aspartase-producing microorganism, and the precipitate is filtered off. Thus, the aspartase or the aspartase-producing microorganism can be used only once and must be discarded thereafter.

Recently, Chibata, et al. succeeded in overcoming overcome the aforementioned disadvantages of prior art methods (Japanese Patent Publication Nos. 6870 and 17587/1970). For example, the method of Jap. Pat. Pub. No. 6870/1970 comprises binding aspartase to an anion exchange polysaccharide adsorbent to form a substantially insoluble complex, and reacting ammonium fumarate with the aspartase complex. According to the method of Jap. Pat. Pub. No. 17587/1970, L-aspartic acid can be prepared by polymerizing N,N'-methylene-bis(acrylamide) in an aqueous aspartase solution. The resultant water-insoluble aspartase preparation is then enzymatically reacted with ammonium fumarate. However, the methods of these Japanese patent publications are disadvantageous in that they require the use of aspartase extracted from an aspartase-producing microorganism. Furthermore, denaturation of the enzyme and/or a remarkable loss in enzymatic activity inevitably occurs in the course of the extraction and concentration of the extract.

As a result of various investigations, we have not found that an aspartase-producing microorganism immobilized with a semipermeable membrane can be advantageously employed in the production of L-aspartic acid.

According to the present invention, L-aspartic acid can be prepared by polymerizing at least one monomer selected from the group consisting of acrylamide, N,N'-lower alkylene-bis(acrylamide) and bis(acrylamidomethyl)ether in an aqueous suspension contianing an aspartase-producing microorganism, and subjecting the resultant immobilized aspartase-producing microorganism to enzymatic reaction with ammonium fumarate of a mixture of fumaric acid or its salt and an inorganic ammonium salt.

The polymerization reaction of the present invention is preferably carried out in the presence of a polymerization initiator and a polymerization accelerator. Potassium persulfate, ammonium persulfate, vitamin $B_2$ and Methylene Blue are suitable as the polymerization initiator. On the other hand, $\beta$-(dimethylamino)propionitrile and N,N,N', N'-tetramethyl-ethylenediamine are employed as the polymerization accelerator. It is preferred to carry out the reaction at 10° to 50°C, especially at 20° to 40°C. The reaction may be completed within 10 to 60 minutes. Microorganisms which produce aspartase are employed for the purpose of the present invention. Examples of aspartase-producing microorganisms include *Escherichia coli* ATCC No. 11303, *Pseudomonas aeruginosa* OUT (Faculty of Technology, Osaka University, Japan) No. 8252, *Serratia marcescens* OUT No. 8259, *Proteus vulgaris* OUT No. 8226 [Another designation of the microorganism: FERM-P (Fermentation Research Institute, Japan) No. 526], *Bacterium succinium* IAM (Institute of Applied Microbiology, Tokyo University, Japan) No. 1017 and *Alcaligenes faecalis* OUT No. 8030.

All of these microorganisms are publicly available from the above mentioned collections. However, it should be noted that the present invention is not limited to the use of these specific microorganisms, but includes wihtin its scope the use of all aspartase-producing microorganisms. The polymerization reaction of the present invention serves to tightly entrap each of the micro-organisms into the lattice of the polymer thereby affording high enzymatic activity for a long period of time.

L-aspartic acid can be prepared by contacting the resultant immobilized microorganism with ammonium fumarate or a mixture of fumaric acid or its salt and an inorganic ammonium salt. Suitable examples of the salt of fumaric acid include alkali metal salts thereof such as sodium fumarate and potassium fumarate. Ammonium chloride, ammonium sulfate and ammonium phosphate are preferred as the inorganic ammonium salt. When a mixture of fumaric acid or its salt and an inorganic ammonium salt is employed in the enzymatic reaction, the preferred proportion of inorganic ammonium salt in the mixutre is about 1.5 to 2 moles to one mole of fumaric acid or fumaric acid salt. Divalent metal ion may be added to the enzymatic reaction solution to keep the enzymatic activity of the immobilized microorganism at a high level during the reaction. For example, when the enzymatic reaction is carried out in the presence of divalent metal ion, the enzymatic potency of the immobilized microorganism shows no substantial depression even after one month of successive use. Suitable examples of the divalent metal ion include calcium, magnesium, manganous and strontium ions. The preferred concentration of divalent metal ion in the reaction solution is about 0.1 to 10 milimoles/liter.

The concentration of substrate employed is not critical in the present invention. That is, ammonium fumarate or a mixture of fumaric acid or its salt and an inorganic ammonium salt is dissolved in water in any concentration. The solution is then adjusted to a pH of 7 to 9. The aforementioned immobilized microorganism is suspended in the solution, and the mixture is incubated at a temperature of 25° to 45°C, with stirring, until the reaction is complete. When the reaction is completed, the mixture is filtered or centrifuged to recover the immobilized microorganism for subsequent use. L-aspartic acid is recovered from the filtrate or supernatant liquid. Alternatively, the enzymatic reaction of the invention may be performed by a column method. The column method enables the reaction to be carried out in a successive manner. For example, the immobilized microorganism is charged into a column, and an aqueous solution (pH 8 to 9) containing ammonium fumarate or a mixture of fumaric acid or its salt and an inorganic ammonium salt is passed through the column at 30° to 45°C, and at a suitable flow rate. An aqueous solution containing L-aspartic acid is obtained as the effluent. The effluent is adjusted to pH 2.8 to 3.0 with concentrated sulfuric acid. L-aspartic acid is thereby obtained as a crystalline precipitate. In carrying out the enzymatic reaction, the conversion rate of ammonium fumarate to L-aspartic acid mainly depends upon the enzymatic potency of the immobilized microorganism, the temperature and the reaction time. With the column method, however, one can readily obtain the optimum reaction condition for complete complete conversion of ammonium fumarate to L-aspartic acid by adjusting the flow rate of the substrate solution.

In any case, during the reaction the immobilized microorganism of the present invention retains a high level of enzymatic activity, especially in the presence of divalent metal ion. Moreover, due to the sufficient durability of the enzymic activity of the immobilized microorganism of the invention, repeated use of the immobilized microorganism is possible.

Practical and presently-preferred embodiments of the present invention will be shown in the following Examples. In this specification, the terminology "lower alkylene" should be interpreted as referring to alkylene groups having one to five carbon atoms.

EXAMPLE 1

4.8 g of the microbial cells of *Escherichia coli* ATCC No. 11303 are suspended in 48 ml of physiological saline solution. 9 g of acrylamide, 480 mg of N,N'-methylene-bis (acrylamide), 6 ml of 5 percent β-(dimethylamino)-propionitrile and 6 ml of 2.5 percent potassium persulfate are added to the suspension. Then, the suspension is allowed to stand at 37°C for 10 minutes. 120 ml of an immobilized preparation of *Escherichia coli* ATCC No. 11303 are obtained.

120 ml of the immobilized preparation of *Escherichia coli* ATCC No. 11303 are charged into a 2.1 cm × 34.8 cm. column. 150 g of ammonium fumarate are dissolved in 900 ml of water. The aqueous solution is adjusted to pH 8.5 with aqueous ammonia and diluted with water to bring the total volume to 1 liter. Then, the aqueous solution is continuously passed through the column at 37°C at a flow rate of 20 ml/hr. The effluent is adjusted to pH 2.8 to 3.0 with concentrated sulfuric acid. The crystalline precipitate is collected by filtration and then washed with methanol. 126.3 g of L-aspartic acid are obtained.

$$[\alpha]_D^{20} + 24.8° \ (C = 1, 6N-HCl)$$

EXAMPLE 2

An immobilized preparation of *Escherichia coli* ATCC No. 11303 is prepared in the manner described in Example 1. 50 ml of the immobilized preparation are charged into a 2.1 cm × 14.5 cm. column: An aqueous solution (pH 8.5) containing 1 M-concentration of ammonium fumarate is continuously passed through the column at 37°C at a flow rate as shown in Table 1. The concentration of L-aspartic acid in the effluent is assayed biologically by using *Leuconostoc mesenterioides* P-60 as a sensitive microorganism, and the percentage conversion of ammonium fumarate to L-aspartic acid is calculated therefrom. The results are shown in Table 1.

Table 1

| Flow rate (ml/hr) | Conversion to L-aspartic acid (%) |
|---|---|
| 25 | 45 |
| 12.5 | 92 |
| 6.5 | 100 |
| 3.5 | 100 |

EXAMPLE 3

50 ml of an immobilized preparation of *Escherichia coli* ATCC No. 11303 prepared in the manner described in Example 1 are charged into a 2.1 cm × 14.5 cm. column. An aqueous solution (pH 8.5) containing 1 M-concentration of ammonium fumarate is continuously passed through the column at 37°C at a flow rate as shown in Table 2. The concentration of L-aspartic acid in the effluent obtained with the passage of time is assayed in the manner described in Example 2. The percentage conversion of ammonium fumarate to L-aspartic acid is calculated therefrom. The results are shown in Table 2.

Table 2

| | Conversion of ammonium fumarate to L-aspartic acid (%) | |
|---|---|---|
| | Flow rate | |
| Operation time (days) | 25 ml/hr | 6.5 ml/hr |
| 3 | 45 | 100 |
| 6 | 46 | 100 |
| 9 | 44 | 100 |
| 12 | 47 | 100 |
| 15 | 45 | 100 |
| 18 | 46 | 100 |
| 21 | 46 | 100 |
| 24 | 45 | 100 |
| 27 | 46 | 100 |
| 30 | 45 | 100 |

EXAMPLE 4

An aqueous solution of 112.5 g of ammonium fumarate in 450 ml of water is adjusted to pH 8.5 with aqueous ammonia and then diluted with water to bring the total volume to 500 ml. 60 ml of an immobilized preparation of *Escherichia coli* ATCC No. 11303 prepared in the manner described in Example 1 are added to the aqueous solution. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 3.

Table 3

| Reaction time (hr) | Conversion to L-aspartic acid (%) |
|---|---|
| 3 | 15 |
| 5 | 30 |
| 10 | 82 |
| 24 | 100 |

After stirring for 24 hours, the mixture is filtered. The filtrate is adjusted to pH 2.8 to 3.0 with concentrated sulfuric acid. The crystalline precipitate is collected by filtration and then washed with methanol. 89.7 g of L-aspartic acid are obtained.

$[\alpha]_D^{20} + 24.8°$ (C = 1, 6N–HCl)

EXAMPLE 5

2.4 g of the microbial cells of *Pseudomonas aeruginosa* OUT No. 8252 are suspended in 24 ml of a physiological saline solution. 4.5 g of acrylamide, 240 mg of N,N'-methylene-bis(acrylamide), 3 ml of 5 percent β-(dimethylamino)-propionitrile and 3 ml of 2.5 percent potassium persulfate are added to the suspension. Then, the suspension is allowed to stand at 37°C for 10 minutes. 60 ml of an immobilized preparation of *Pseudomonas aeruginosa* OUT No. 8252 are obtained.

60 ml of the immobilized preparation of *Pseudomonas aeruginosa* OUT No. 8252 are charged into a 2.1 cm × 17.4 cm. column. 500 ml of an aqueous solution (pH 8.5) containing 1 M-concentration of ammonium fumarate is passed through the column at 37°C at a flow rate of 10 ml/hr. The effluent is adjusted to pH 2.8 to 3.0 with concentrated sulfuric acid. The crystalline precipitate is collected by filtration and then washed with methanol. 6.31 g of L-aspartic acid are obtained.

$[\alpha]_D^{20} + 24.8°$ (C = 1, 6N–HCl)

EXAMPLE 6

2.4 g of the microbial cells of *Serratia marcescens* OUT No. 8259 are treated in the manner described in Example 5. 60 ml of an immobilized preparation of *Serratia marcescens* OUT No. 8259 are obtained. A mixture of 60 ml of the immobilized preparation, 58 g of fumaric acid and 37.1 g of ammonium chloride is added to 450 ml of water. The mixture is adjusted to pH 8.5 with an aqueous 1 N-sodium hydroxide solution and then diluted with water to bring the total volume to 500 ml. The mixture is stirred at 37°C for 24 hours. The mixture is filtered. The filtrate is adjusted to pH 2.8 to 3.0 with concentrated sulfuric acid. The crystalline precipitate is collected by filtration and washed with methanol. 62.9 g of L-aspartic acid are obtained.

$[\alpha]_D^{20} + 24.8°$ (C = 1, 6N–HCl)

EXAMPLE 7

*Escherichia coli* ATCC No. 11303 is inoculated into one liter of a medium (pH 7.0) containing 3 w/v percent of ammonium fumarate, 0.2 w/v percent of dipotassium phosphate, 0.05 w/v percent of magnesium sulfate 7 hydrate, 4 w/v percent of corn steep liquor and 0.05 w/v percent of calcium carbonate. The medium is cultivated at 37°C for 20 hours under shaking. After the cultivation, the microbial cells of *Escherichia coli* ATCC No. 11303 are collected by centrifugation. The microbial cells are suspended in 40 ml of physiological saline solution. 7.5 g acrylamide, 0.4 g of N,N'-methylene-bis(acrylamide), 5 ml of 5 percent β-(dimethylamino)-propionitrile and 5 ml of 2.5 percent potassium persulfate are added to the suspension. Then, the suspension is allowed to stand at 37°C for 10 minutes. 110 ml of an immobilized preparation of *Escherichia coli* ATCC No. 11303 are obtained.

110 ml of the immobilized preparation of *Escherichia coli* ATCC No. 11303 are charged into a 2 cm × 35 cm. column. 300 g of ammonium fumarate and 0.4 g of manganous chloride 4 hydrate are dissolved in 1.8 liter of water. The aqueous solution is adjusted to pH 8.5 with aqueous ammonia and diluted with water to bring the total volume to 2 liters. Then, the aqueous solution is continuously passed through the column at 37°C at a flow rate of 55 ml/hr. The effluent is adjusted to pH 2.8 to 3.0 with concentrated sulfuric acid. The crystalline precipitate is collected by filtration and then washed with cold water and methanol. 252.9 g of L-aspartic acid are obtained.

$[\alpha]_D^{20} + 24.8°$ (C = 1, 6N–HCl)

EXAMPLE 8

50 ml of an immobilized preparation of *Escherichia coli* ATCC No. 11303 prepared in the manner de- Table 4

| Operation time (days) | Conversion of ammonium fumarate to L-aspartic acid (%) | | | | No addition of metal ion |
|---|---|---|---|---|---|
| | Metal ion added | | | | |
| | Ca++ | Mg++ | Mn++ | Sr++ | |
| 3 | 100 | 100 | 100 | 100 | 100 |
| 10 | 100 | 100 | 100 | 100 | 100 |
| 20 | 100 | 100 | 100 | 100 | 100 |
| 30 | 100 | 100 | 100 | 100 | 90 |
| 40 | 100 | 100 | 100 | 95 | 76 |
| 50 | 95 | 96 | 100 | — | 40 |
| 60 | — | — | 90 | — | 27 | scribed in Example 7 are charged into a 2 cm × 16 cm. column. An aqueous solution (pH 8.5) containing 1 M-concentration of ammonium fumarate and 1 mM-concentration of a metal ion as shown in Table 4 is continuously passed through the column at 37°C at a flow rate of 30 ml/hr. The concentration of L-aspartic acid in the effluent obtained with the passage of time is assayed in the manner described in Example 2, and the percentage conversion of ammonium fumarate to L-aspartic acid is calculated therefrom. The results are shown in Table 4.

EXAMPLE 9

50 ml of an immobilized preparation of Escherichia coli ATTC No. 11303 prepared in the manner described in Example 7 are charged into a 2 cm × 16 cm.

column. An aqueous solution (pH 8.5) containing 1 M-concentration of ammonium fumarate and 1 mM-concentration of manganous ion is continuously passed through the column at 37°C at a flow rate as shown in Table 5. The concentration of L-aspartic acid in the effluent is assayed in the manner described in Example 2, and the percentage conversion of ammonium fumarate to L-aspartic acid is calculated therefrom. The results are shown in Table 5.

Table 5

| Flow rate (ml/hr) | Conversion to L-aspartic acid (%) |
|---|---|
| 90 | 55 |
| 60 | 60 |
| 40 | 81 |
| 30 | 100 |
| 25 | 100 |

EXAMPLE 10

An aqueous solution of 150 g of ammonium fumarate and 0.2 g of manganous chloride 4 hydrate in 900 ml of water is adjusted to pH 8.5 with aqueous ammonia and then diluted with water to bring the total volume to one liter. 100 ml of an immobilized preparation of *Escherichia coli* ATCC No. 11303 prepared in the manner described in Example 7 are added to the aqueous solution. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 6.

Table 6

| Reaction time (hr) | Conversion to L-aspartic acid (%) |
|---|---|
| 3 | 30 |
| 5 | 64 |
| 8 | 86 |
| 10 | 100 |

After stirring for 10 hours, the mixture is filtered. The filtrate is adjusted to pH 2.8 to 3.0 with concentrated sulfuric acid. The crystalline precipitate is collected by filtration and then washed with cold water and methanol. 126.4 g of L-aspartic acid are obtained.

$[\alpha]_D^{20} + 24.8°$ (C = 1, 6N–HCl)

EXAMPLE 11

*Pseudomonas aeruginosa* OUT No. 8252 is inoculated into one liter of a medium (pH 7.0) containing 3 w/v percent of sodium fumarate, 2 w/v percent of ammonium sulfate, 0.2 w/v percent of peptone and 0.5 w/v percent of yeast extract. The medium is cultivated at 37°C for 20 hours under shaking. After the cultivation, the microbial cells of *Pseudomonas aeruginosa* OUT No. 8252 are collected by centrifugation. The microbial cells are suspended in 48 ml of physiological saline solution. 9 g of acrylamide, 0.48 g of N,N'-methylene-bis(acrylamide), 6 ml of 5 percent β-(dimethylamino)-propionitrile and 6 ml of 2.5 percent potassium persulfate are added to the suspension. Then, the suspension is allowed to stand at 37°C for 10 minutes. 120 ml of an immobilized preparation of *Pseudomonas aeruginosa* OUT No. 8252 are obtained.

120 ml of the immobilized preparation of *Pseudomonas aeruginosa* OUT No. 8252 are charged into a 2 cm × 38 cm column. One liter of an aqueous solution (pH 8.5) containing 1 M-concentration of ammonium fumarate and 1 mM-concentration of manganous ion is continuously passed through the column at 37°C at a flow rate of 20 ml/hr. The effluent is adjusted to pH 2.8 to 3.0 with concentrated sulfuric acid. The crystalline precipitate is collected by filtration and then washed with cold water and methanol. 126.0 g of L-aspartic acid are obtained.

$[\alpha]_D^{20} + 24.8°$ (C = 1, 6N–HCl)

EXAMPLE 12

*Serratia marcescens* OUT No. 8259 is inoculated into one liter of a medium (pH 7.0) containing 3 w/v percent of sodium fumarate, 2 w/v percent of ammonium sulfate, 0.2 w/v percent of peptone and 0.5 w/v percent of yeast extract. The medium is cultivated at 37°C for 20 hours under shaking. After the cultivation, the microbial cells of *Serratia marcescens* OUT No. 8259 are collected by centrifugation. The microbial cells are suspended in 32 ml of physiological saline solution. 6 g of acrylamide, 0.32 g of N,N'-methylene-bis(acrylamide), 4 ml of 5 percent β-(dimethylamino)-propionitrile and 4 ml of 2.5 percent potassium persulfate are added to the suspension. Then, the suspension is allowed to stand at 37°C for 10 minutes. 100 ml of an immobilized preparation of *Serratia marcescens* OUT No. 8259 are obtained.

100 ml of the immobilized preparation of *Serratia marcescens* OUT No. 8259 are added to one liter of an aqueous solution (pH 8.5) containing 160 g of sodium fumarate, 4.2 g of ammonium chloride and 0.2 g of manganous chloride 4 hydrate. The mixture is stirred at 37°C for 24 hours. The mixture is filtered. The filtrate is adjusted to pH 2.8 to 3.0 with concentrated sulfuric acid. The crystalline precipitate is collected by filtration and then washed with cold water and methanol. 126.4 g of L-aspartic acid are obtained.

$[\alpha]_D^{20} + 24.8°$ (C = 1, 6N–HCl)

EXAMPLE 13

2.4 g of the microbial cells of *Escherichia coli* ATCC No. 11303 are suspended in 24 ml of physiological saline solution. 4.5 g of acrylamide, 240 mg of N,N'-methylene-bis(acrylamide), 3 ml of 5 percent β-(dimethylamino)-propionitrile and 3 ml of 2.5 percent potassium persulfate are added to the suspension. Then, the suspension is allowed to stand at 37°C for 30 minutes. 60 ml of an immobilized preparation of *Escherichia coli* ATCC No. 11303 are obtained.

60 ml of the immobilized preparation of *Escherichia coli* ATCC No. 11303 are added to 500 ml of an aqueous solution (pH 8.5) containing 1 M-concentration of ammonium fumarate and 1 mM-concentration of manganous ion. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 7.

Table 7

| Reaction time (hr.) | Conversion to L-aspartic acid (%) |
|---|---|
| 5 | 57 |
| 8 | 80 |
| 10 | 100 |

EXAMPLE 14

2.4 g. of the microbial cells of *Escherichia coli* ATCC No. 11303 are suspended in 24 ml of a physiological saline solution. 4.5 g of acrylamide, 240 mg of N,N'-propylene-bis(acrylamide), 3 ml of 5 percent β-(dimethylamino)-propionitrile and 3 ml of 2.5 percent potassium persulfate are added to the suspension. Then, the suspension is allowed to stand at 37°C for 30 minutes. 57 ml of an immobilized preparation of *Escherichia coli* ATCC No. 11303 are obtained.

57 ml of the immobilized preparation of *Escherichia coli* ATCC No. 11303 are added to 500 ml of an aqueous solution (pH 8.5) containing 1 M-concentration of ammonium fumarate and 1 mM-concentration of manganous ion. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 8.

Table 8

| Reaction time (hr.) | Conversion to L-aspartic acid (%) |
|---|---|
| 5 | 35 |
| 8 | 64 |
| 10 | 89 |
| 15 | 100 |

EXAMPLE 15

2.4 g of the microbial cells of *Escherichia coli* ATCC No. 11303 are suspended in 24 ml of a physiological saline solution. 4.5 g of acrylamide, 240 mg of bis(acrylamidomethyl) ether, 3 ml of 5 percent β-(dimethylamino)-propionitrile and 3 ml of 2.5 percent potassium persulfate are added to the suspension. Then, the suspension is allowed to stand at 37°C for 30 minutes.

52 ml of the immobilized preparation of *Escherichia coli* ATCC No. 11303 are obtained.

52 ml of the immobilized preparation of *Escherichia coli* ATCC No. 11303 are added to 500 ml of an aqueous solution (pH 8.5) containing 1 M-concentration of ammonium fumarate and 1 mM-concentration of manganous ion. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 9.

Table 9

| Reaction time (hr.) | Conversion to L-aspartic acid (%) |
|---|---|
| 5 | 30 |
| 8 | 61 |
| 10 | 82 |
| 15 | 100 |

EXAMPLE 16

2.4 g of the microbial cells of *Escherichia coli* ATCC No. 11303 are suspended in 24 ml of a physiological saline solution. 60 mg of N,N'-methylene-bis(acrylamide), 1.8 ml of 0.112 percent N,N,N',N'-tetramethylethylenediamine and 0.2 ml of 2.5 percent ammonium persulfate are added to the suspension. Then, the suspension is allowed to stand at 37°C for 60 minutes. 36 ml of an immobilized preparation of *Escherichia coli* ATCC No. 11303 are obtained.

36 ml of the immobilized preparation of *Escherichia coli* ATCC No. 11303 are added to 500 ml of an aqueous solution (pH 8.5) containing 1 M-concentration of ammonium fumarate and 1 mM-concentration of manganous ion. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 10.

Table 10

| Reaction time (hr.) | Conversion to L-aspartic acid (%) |
|---|---|
| 5 | 19 |
| 8 | 47 |
| 10 | 76 |
| 15 | 92 |
| 20 | 100 |

EXAMPLE 17

2.4 g of the microbial cells of *Escherichia coli* ATCC No. 11303 are suspended in 24 ml of physiological saline solution. 60 mg of N,N'-propylene-bis(acrylamide), 1.8 ml of 0.112 percent N,N,N',N'-tetramethylethylenediamine and 0.2 ml of 2.5 percent ammonium persulfate are added to the suspension. Then, the suspension is allowed to stand at 37°C for 60 minutes. 42 ml of an immobilized preparation of *Escherichia coli* ATCC No. 11303 are obtained.

42 ml of the immobilized preparation of *Escherichia coli* ATCC No. 11303 are added to 500 ml of an aqueous solution (pH 8.5) containing 1 M-concentration of ammonium fumarate and 1 mM-concentration of manganous ion. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 11.

Table 11

| Reaction time (hr.) | Conversion to L-aspartic acid (%) |
| --- | --- |
| 5 | 14 |
| 8 | 23 |
| 10 | 47 |
| 15 | 71 |
| 20 | 89 |
| 25 | 100 |

EXAMPLE 18

2.4 g of the microbial cells of *Escherichia coli* ATCC No. 11303 are suspended in 24 ml of a physiological saline solution. 60 mg of bis(acrylamidomethyl)ether, 1.8 ml of 0.112 percent N,N,N',N'-tetramethylethylenediamine and 0.2 ml of 2.5 percent ammonium persulfate are added to the suspension. Then, the suspension is allowed to stand at 37°C for 60 minutes. 35 ml of an immobilized preparation of *Escherichia coli* ATCC No. 11303 are obtained.

35 ml of the immobilized preparation of *Escherichia coli* ATCC No. 11303 are added to 500 ml of an aqueous solution (pH 8.5) containing 1 M-concentration of ammonium fumarate and 1 mM-concentration of manganous ion. The mixture is stirred at 37°C for a period of time. The concentration of L-aspartic acid in the mixture is assayed in the manner described in Example 2, and the percentage conversion of ammonium fumarate to L-aspartic acid is calculated therefrom. The results are shown in Table 12.

Table 12

| Reaction time (hr.) | Conversion to L-aspartic acid (%) |
| --- | --- |
| 5 | 17 |
| 8 | 27 |
| 10 | 55 |
| 15 | 84 |
| 20 | 100 |

What we claim is:

1. A process for preparing L-aspartic acid which comprises polymerizing at least one monomer selected from the group consisting of acrylamide, N,N'-lower alkylene-bis(acrylamide) and bis(acrylamidomethyl)ether in an aqueous suspension of an aspartase-producing microorganism to produce an immobilzied aspartase-producing microorganism, and subjecting the immobilized aspartase-producing microorganism to enzymatic reaction with ammonium fumarate or a mixture of fumaric acid or its salt and an inorganic ammonium salt.

2. The process according to claim 1, wherein acrylamide and N,N'-lower alkylene-bis(acrylamide) are polymerized.

3. The process according to claim 1, wherein acrylamide and bis(acrylamidomethyl)ether are polymerized.

4. The process according to claim 1, wherein N,N'-lower alkylene-bis(acrylamide) or bis(acrylamidomethyl)ether are polymerized.

5. The process according to claim 1, wherein the polymerization is carried out in the presence of a polymerization initiator and a polymerization accelerator at 10° to 50°C.

6. The process according to claim 1, wherein the enzymatic reaction is carried out at 25° to 45°C, at pH 7 to 9.

7. A process for preparing L-aspartic acid which comprises copolymerizing acrylamide and N,N'-lower alkylene-bis(acrylamide) in an aqueous suspension of an aspartase-producing microorganism at 10° to 50°C in the presence of a polymerization initiator and a polymerization accelerator to produce an immobilized aspartase-producing microorganism, and subjecting the immobilized aspartase-producing microorganism to enzymatic reaction with ammonium fumarate or a mixture of fumaric acid or its salt and an inorganic ammonium salt at 25° to 45°C, at pH 7 to 9.

8. A process for preparing L-aspartic acid which comprises copolymerizing acrylamide and bis(acrylamidomethyl)ether in an aqueous suspension of an aspartase-producing microorganism at 10° to 50°C in the presence of a polymerization initiator and a polymerization accelerator to produce an immobilized aspartase-producing microorganism, and subjecting the immobilized aspartase-producing microorganism to enzymatic reaction with ammonium fumarate or a mixture of fumaric acid or its salt and an inorganic ammonium salt at 25° to 45°C, at pH 7 to 9.

9. A process for preparing L-aspartic acid which comprises polymerizing N,N'-lower alkylene-bis(acrylamide) or bis (acrylamidomethyl)ether in an aqueous suspension of an aspartase-producing microorganism at 10° to 50°C in the presence of a polymerization initiator and a polymerization accelerator to produce an immobilized aspartase-producing microorganism, and subjecting the immobilized aspartase-producing microorganism to enzymatic reaction with ammonium fumarate or a mixture of fumaric acid or its salt and an inorganic ammonium salt at 25° to 45°C, at pH 7 to 9.

10. The process according to claim 5, wherein the polymerization initiator is selected from the group consisting of potassium persulfate, ammonium persulfate, vitamin $B_2$ and methylene blue.

11. The process according to claim 7, wherein the polymerization initiator is selected from the group consisting of potassium persulfate, ammonium persulfate, vitamin $B_2$ and methylene blue.

12. The process according to claim 8, wherein the polymerization initiator is selected from the group consisting of potassium persulfate, ammonium persulfate, vitamin $B_2$ and methylene blue.

13. The process according to claim 9, wherein the polymerization initiator is selected from the group consisting of potassium persulfate, ammonium persulfate, vitamin $B_2$ and methylene blue.

14. The process according to claim 5, wherein the polymerization accelerator is selected from the group consisting of β-(dimethylamino)-propionitrile and N,N',N',N'-tetra-methylethylenediamine.

15. The process according to claim 7, wherein the polymerization accelerator is selected from the group consisting of β-(dimethylamino)-propionitrile and N,N',N',N'-tetra-methylethylenediamine.

16. The process according to claim 8, wherein the polymerization accelerator is selected from the group consisting of β-(dimethylamino)-propionitrile and N,N',N'-tetra-methylethylenediamine.

17. The process according to claim 9, wherein the polymerization accelerator is selected from the group consisting of β-(dimethylamino)-propionitrile and N,N',N'-tetra-methylethylenediamine.

18. The process according to claim 1, wherein the salt of fumaric acid is selected from the group consisting of sodium fumarate and potassium fumarate.

19. The process according to claim 7, wherein the salt of fumaric acid is selected from the group consisting of sodium fumarate and potassium fumarate.

20. The process according to claim 8, wherein the salt of fumaric acid is selected from the group consisting of sodium fumarate and potassium fumarate.

21. The process according to claim 9, wherein the salt of fumaric acid is selected from the group consisting of sodium fumarate and potassium fumarate.

22. The process according to claim 1, wherein the inorganic ammonium salt is selected from the group consisting of ammonium chloride, ammonium sulfate and ammonium phosphate.

23. The process according to claim 7, wherein the inorganic ammonium salt is selected from the group consisting of ammonium chloride, ammonium sulfate and ammonium phosphate.

24. The process according to claim 8, wherein the inorganic ammonium salt is selected from the group consisting of ammonium chloride, ammonium sulfate and ammonium phosphate.

25. The process according to claim 9, wherein the inorganic ammonium salt is selected from the group consisting of ammonium chloride, ammonium sulfate and ammonium phosphate.

26. The process according to claim 1, wherein the enzymatic reaction is carried out in the presence of 0.1 to 10 millimoles/liter of a divalent metal ion.

27. The process according to claim 7, wherein the enzymatic reaction is carried out in the presence of 0.1 to 10 millimoles/liter of a divalent metal ion.

28. The process according to claim 8, wherein the enzymatic reaction is carried out in the presence of 0.1 to 10 millimoles/liter of a divalent metal ion.

29. The process according to claim 9, wherein the enzymatic reaction is carried out in the presence of 0.1 to 10 millimoles/liter of a divalent metal ion.

30. The process according to claim 26, wherein the divalent metal ion is selected from the group consisting of calcium, magnesium, manganous and strontium ion.

31. The process according to claim 27, wherein the divalent metal ion is selected from the group consisting of calcium, magnesium, manganous and strontium ion.

32. The process according to claim 28, wherein the divalent metal ion is selected from the group consisting of calcium, magnesium, manganous and strontium ion.

33. The process according to claim 29, wherein the divalent metal ion is selected from the group consisting of calcium, magnesium, manganous and strontium ion.

* * * * *